US007895079B2

(12) United States Patent
Jain et al.

(10) Patent No.: US 7,895,079 B2
(45) Date of Patent: Feb. 22, 2011

(54) METHOD AND DEVICE UTILIZING POLYMORPHIC DATA IN E-COMMERCE

(75) Inventors: Mudita Jain, Los Altos, CA (US); Jari Koistinen, Stockholm (SE); Charles Boyle, Pleasant Hill, CA (US); Brian Hayes, Lafayette, CA (US)

(73) Assignee: Open Invention Network, LLC, Pound Ridge, NY (US)

( * ) Notice: Subject to any disclaimer, the term of this patent is extended or adjusted under 35 U.S.C. 154(b) by 440 days.

(21) Appl. No.: 11/343,039

(22) Filed: Jan. 30, 2006

(65) Prior Publication Data

US 2006/0143089 A1    Jun. 29, 2006

Related U.S. Application Data

(63) Continuation of application No. 09/730,489, filed on Dec. 5, 2000, now Pat. No. 6,993,506.

(51) Int. Cl.
    *G06Q 30/00* (2006.01)
(52) U.S. Cl. .............................. 705/26; 705/10; 705/14; 705/27; 705/39; 705/41; 705/51; 705/53; 705/54; 705/59; 705/65; 709/204; 709/206; 709/223; 709/225; 709/217; 709/219; 709/224; 709/229
(58) Field of Classification Search .................... 705/26
    See application file for complete search history.

(56) References Cited

U.S. PATENT DOCUMENTS 5,790,677 A *  8/1998  Fox et al. ....................... 705/78

| | | |
|---|---|---|
| 6,009,543 A | 12/1999 | Shavit |
| 6,023,508 A | 2/2000 | Bombard et al. |
| 6,049,785 A | 4/2000 | Gifford |
| 6,125,391 A | 9/2000 | Meltzer et al. |
| 6,195,651 B1 * | 2/2001 | Handel et al. .................. 707/2 |

(Continued)

FOREIGN PATENT DOCUMENTS

AT          0945789          9/1999

OTHER PUBLICATIONS

Bond, Robert and Whiteley, Caroline. Untangling the web: A review of certain secure e-commerce legal issues. International Review of Law, Computers & Technology, v12n2, pp. 349-370, Jul. 1998.*

(Continued)

*Primary Examiner*—F. Zeender
*Assistant Examiner*—Fawaad Haider
(74) *Attorney, Agent, or Firm*—Ernest J. Beffel, Jr.; Haynes Beffel & Wolfeld LLP

(57) ABSTRACT

An aspect of the present invention includes a protocol for conveying data during an e-commerce session with a polymorphic response, comprising initiating a session with a message from a buyer application to a broker application and a session identifier assigned by the broker application; conducting the session between the buyer application and a supplier application; and concluding the session with a additional message which includes a schema identifier for the additional message, resolvable in a context of a system identifier; and a polymorphic response comprising a type and a version, wherein the polymorphic response includes additional data elements corresponding to values assigned to the type and version.

11 Claims, 4 Drawing Sheets

U.S. PATENT DOCUMENTS

| | | | |
|---|---|---|---|
| 6,256,664 B1 * | 7/2001 | Donoho et al. | 709/204 |
| 6,341,353 B1 | 1/2002 | Herman et al. | |
| 6,697,824 B1 * | 2/2004 | Bowman-Amuah | 709/229 |
| 6,968,513 B1 * | 11/2005 | Rinebold et al. | 715/854 |
| 6,993,506 B2 | 1/2006 | Jain et al. | |

OTHER PUBLICATIONS

"Surrogate buyers and the new product adoption process: a conceptualization and managerial framework", The journal or consumer marketing.Santa Barbara: 1997. vol. 14, Iss. 5; p. 391, Proquest.

QueryObject and InterNetivity Collaborate on E-Commerce Solution, Uniondale, N.Y.—Jun. 2, 1999.

Hirshfield, Stuart; Object-Oriented Programming; 1996; CRC Press; pp. 253-255.

Orr, What's The Blg Deal About Objects?, Nov. 1992, Computer-Aided Engineering.

F. Bergeron and L. Raymond, "Managing EDI for corporate advantage: A longitudinal study," Information & Management, 31, 1997, pp. 319-333, Elsevier.

Robert J. Bonometti, Raymond W. Smith, and Patrick E. White, "The Walls Coming Down: Interoperability Opens the Electronic City," The Future of the Electronic Marketplace, The MIT Press, Cambridge, Massachusetts, 1998, pp. 265-301.

Richard Bort and Gerald R. Bielfeldt, "EDI on the Internet," Handbook of EDI, 1997, pp. B7-1-B7-19, Warren, Gorham & Lamont, USA.

Isabel Gallego, Jaime Delgado, and Jose J. Acebron, "Distributed Models for Brokerage on Electronic Commerce," TREC'98, LINCS 1402, 1998, pp. 129-140, Springer-Verlag Berlin Heidelberg.

John J. Garguilo and Paul Markovitz, "Guidelines for the Evaluation of Electronic data Interchange Products," Draft—Technical Report CAML/CLS, Dec. 6, 1995, Gaithersburg, MD, USA.

Shikhar Ghosh, "Making Business Sense of the Internet," Harvard Business Review, Mar.-Apr. 1998, pp. 126-135.

Li-Pheng Khoo, Shu Beng Tor, and Stephen S. G. Lee, "The Potential of Intelligent Software Agents in the World Wide Web in Automating Part Procurement," International Journal of Purchasing and Materials Management, Jan. 1998, pp. 46-52.

Frederick J. Riggins and Hyeun-Suk (Sue) Rhee, "Toward a Unified View of Electronic Commerce," Communications of the ACM, Oct. 1998, vol. 41, No. 10, pp. 88-95.

* cited by examiner

METHOD AND DEVICE UTILIZING POLYMORPHIC DATA IN E-COMMERCE

PRIORITY INFORMATION

This application is a continuation of U.S. application Ser. No. 09/730,489 (scheduled to issue as U.S. Pat. No. 6,993,506 on 31 Jan. 2006) entitled "Method and Device Utilizing Polymorphic Data in E-Commerce" by Mudita Jain, Jari Koistinen, Charles Boyle and Brian Hayes filed on 5 Dec. 2000.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to use of polymorphic data in a session between a buyer and seller, or any pair of trading partners, mediated by a broker or e-commerce hub. In particular, methods and devices utilizing a flexible service request and session end messages are described.

2. Description of Related Art

A desire for electronic commerce brings trading partners together. Broker or hub applications can facilitate transactions between trading partners in many ways. The broker application can field an initial session start request from the buyer and forward it to a seller, either acknowledging the start of the session explicitly or leaving it to the seller to acknowledge the start of the session to the buyer. This and other variations on the manner in which electronic commerce is implemented have implications for software design.

SUMMARY OF THE INVENTION

An aspect of the present invention includes a protocol for conveying data during an e-commerce session with a polymorphic response, comprising initiating a session with a first message from a buyer application to a broker application and a second message from the broker application to a supplier application; conducting the session between the buyer application and the supplier application; and responding during the session with an additional message which includes a schema identifier for the additional message, resolvable in a context of a system identifier and a polymorphic response comprising a type and a version, wherein the polymorphic response includes additional data elements corresponding to values assigned to the type and version. Additional aspects of the invention can be found in the detailed description, the figures and the claims.

DETAILED DESCRIPTION

The following description of various aspects and embodiments of the invention is presented for purposes of illustration and description. The description is not intended to limit the invention to the precise forms disclosed. Many modifications and equivalent arrangements will be apparent to people skilled in the art.

One embodiment practicing aspects of the present invention is so-called RoundTrip™ software. RoundTrip facilitates connections between buyers and suppliers for connecting via a MarketSite™ portal. Other embodiments of the present invention will be adapted to facilitating connections between trading partners using other e-commerce portals and connections, including OBI compliant protocols. RoundTrip software may be delivered as a patch to the XML commerce connector (XCC) software or as a stand alone package. Buyers use the XCC software or equivalent components of a stand alone package to process polymorphic messages involving the RoundTrip software. Suppliers optionally may use the XCC software. Custom adaptations to the RoundTrip software by suppliers are supported. The RoundTrip software facilitates return of shopping cart data from a supplier application to a buyer application, after the buyer has created the shopping cart at the supplier site. The buyer application can then use the shopping cart data to create a purchase order which it can send to the supplier application without involvement of the RoundTrip software. One aspect of the present invention, found in the RoundTrip software, is use of a polymorphic message in the context of an e-commerce session to respond with results during a session, sometimes at or near the end of the session. A polymorphic message, described further below, is capable by design of returning shopping cart data, product configuration data, tax calculation data, foreign freight forwarding data, status inquiry responses or another form of data which reflects the interaction between the buyer and supplier. Another aspect of the present invention is use of a polymorphic message to initiate a session, the polymorphic message being adaptable to sending out purchase orders, purchase order responses, invoices, advance shipping notices or the like.

In presenting the RoundTrip software embodiment, reference is made to buyers and suppliers. Buyers and suppliers might alternatively be referred to as trading partners. Reference to buyers or buyer applications is to be taken in its broadest sense as referring to a party or application which seeks goods, services, commercial data or the like. Reference to suppliers or supplier applications has a similarly broad meaning, referring to the source of goods, services or data which the buyer seeks out. The RoundTrip software itself is referred to as the broker application. This software and equivalent applications may sometimes be called e-commerce hubs.

Figure 1:
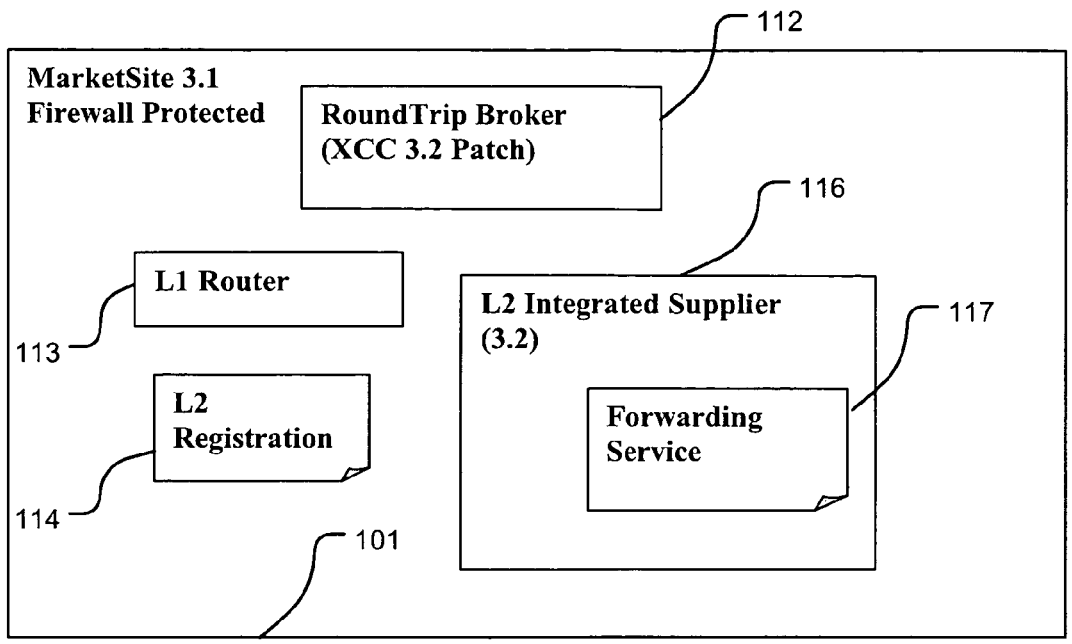
FIG. 1 is a schematic diagram of components useful between buyer and supplier.

FIG. 1 illustrates software components which interact with the RoundTrip software. A firewall 101 surrounds these components. The RoundTrip software may be installed as a patch to the XCC software, both represented by 112. Other software components include an L1 router 113, an L2 registration 114, and an L2 integrated supplier 116 with a forwarding service 117. In practicing the present invention, these components of Commerce One's implementation of the present invention are generally interchangeable with components of alternative e-commerce systems. Fewer or more components can be adapted to practicing aspects of the present invention. Software components may be deployed on one or more of servers in communication with each other via a secure (encrypted or physically secure) or insecure connection. The L1 router 113 routes messages through the portal 101/201. It is useful for this router to be maintained in a DMZ, allowing it to act as a receiving point for all external documents and to make HTTP/S connections with suppliers. To route messages, the L1 router maintains a database of destinations to which it posts messages. These destinations can be URL addresses. The L2 registration component 114 handles and maintains registration of buyers. The L2 integrated supplier 116 provides the service of forwarding messages to trading partners. In this case, it forwards the shopping cart received by the broker application, of which it could be considered a part, to the buyer application. The XCC software operates at the MarketSite Messaging Layer (MML). Buyer application messages to the RoundTrip software are compliant with published MML layer protocols. The RoundTrip software can run on the NT operating system platform. It is designed to use MS SQL Server, Apache web server and JRun. Other embodiments the present invention may be adapted to other operating systems, databases, servers and software interpreters or compilers. The RoundTrip software may be positioned on the opposite side of a firewall from the buyer application, or on the same side.

Figure 2:
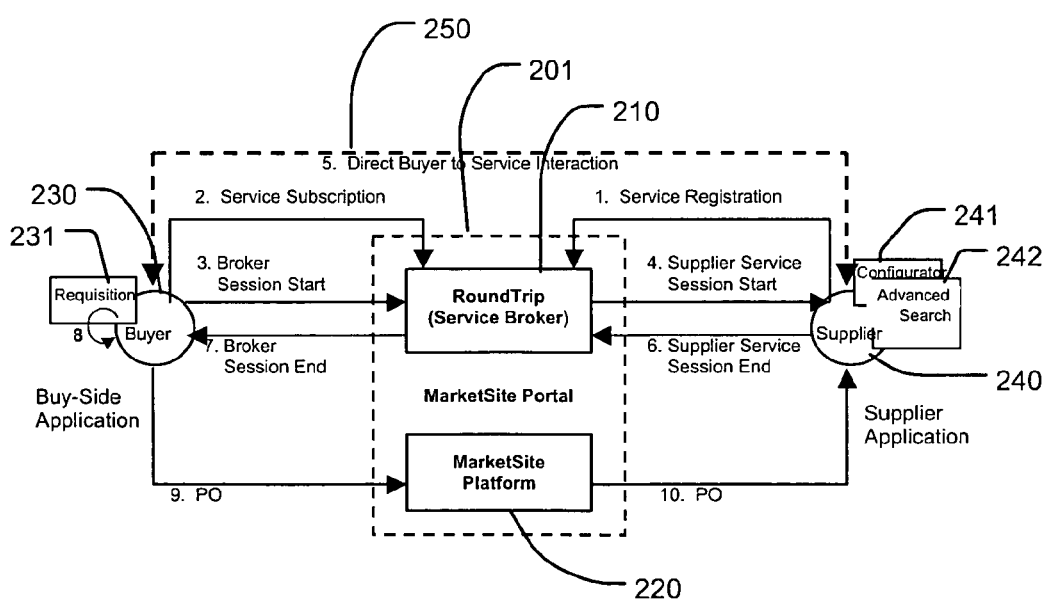
FIG. 2 is a schematic diagram of processes from subscription through purchase order.

FIG. 2 is the high-level data flow for the RoundTrip software. FIGS. 3-6 are excerpts or variations of this figure which illustrate various aspects of data flow. A RoundTrip user navigates through a sequence of links to arrive at the desired supplier's first page. One navigation flow is from a buyer view, to a RoundTrip home page, to a service or supplier selection page, to a supplier first page. An alternative navigation flow would begin from within a catalog, proceeding from a level corresponding to the supplier, product or commodity of interest. The buyer would be routed from the catalog maintained for the buyer to a supplier site. The session during which the buyer is in contact with the supplier may be referred to as a supplier service session or simply a session. The start and end of the session are handled by the RoundTrip software. The interaction between the buyer and supplier may occur directly between the user's web browser and the trading partner's web based service, or may be relayed through the broker.

The following interaction overview can be understood with reference to FIG. 2. The supplier 240 registers with the RoundTrip software 210. This registration to be handled manually, through a registration agent, or online. Online registration many the subject to manual or off-line verification. On the buyer side, the buyer 230 subscribes to one or more RoundTrip 210 enabled services. This can be either a manual procedure or an automated selection. An automated selection is facilitated by use of compatible software by buyer and supplier. Subscription services need to be accompanied by customizations or translators when the supplier side software is not natively compatible with the buyer side software. A broker session starts when a user of the buyer application 230 initiates a session. This may include selecting the RoundTrip home page 210. Interaction during a broker session allows the buyer to view available services and select a specific service. In alternative embodiments, such as for tax calculation, a "buyer" application could automatically invoke the desired service through the broker application, without any explicit act of user selection. When the buyer 230 selects the service, a supplier service session start document flows from the broker application 210 to the supplier application 240. This document may contain both data provided by the buyer during the session and data preregistered by the buyer in a registration database. This document can be transmitted by an HTTP/S Post, to a supplier provided URL with an XML format document in a hidden field. The supplier provided URL corresponds to location with a supplier has a script running that takes the session start document and stores it in a database. The supplier application then does an HTTP redirect to an additional supplier URL that is to be seen by the buyer application. Alternatively, the broker application can provide the redirect data to the buyer application, for the buyer application to execute the redirect. The location at which the session start document is stored is forwarded as a parameter with the redirect message. This may result in a top-level page of the supplier service being displayed on the buyer's browser. In one embodiment of the present invention, the supplier application at the initial URL discards any cookies received before executing the redirect with reference to the location where the session start document is stored, to the additional supplier URL. Use of an HTTP redirect is useful to facilitate proper resolution of relative links to the supplier URL by the buyer's browser and to facilitate proper handling of cookies issued by the supplier URL to a buyer browser. The buyer and supplier may proceed to interact directly 250. Alternatively, their interactions can be routed through the broker. Upon completion of the session, the buyer ends the interaction with the supplier application, for instance by clicking an accept or cancel button. In one embodiment, this results in a shopping cart commitment or in a cancellation. The supplier application 240 sends a supplier service session end document to the broker 210. When the interaction produces a shopping cart, the shopping cart data or a reference thereto is included in the message. The broker application 210 next transmits the session details (e.g., shopping cart) to the buyer application 230. In one embodiment, the broker application does an HTTP post of the message to an appropriate buyer application URL, e.g., for a procurement application. In this embodiment, the RoundTrip software waits for an HTTP Reply from the buyer application. The buyer application 230 may use the order information to create or update a requisition or purchase order 231. Without need for interaction through the broker application, the buyer application may transmit this purchase order through MarketSite software 220 or directly to a supplier 240. Special messages can be used in cases of session cancellation, errors during the session between buyer and supplier, or a recoverable timeout. In the general data flow of FIG. 2, implicit login may be supported, whereby the broker stores the password for the buyer's organization to be sent to the supplier and uses it upon authentication of the buyer. The buyer application may be configured to send a broker both the buyer's userids and passwords for gaining access to the RoundTrip software and to the supplier site. Alternatively, the broker application can maintain a table of userids and passwords for suppliers corresponding to userids and password's provided by the buyer application. At the IP session level, it is useful for communications among the buyer, broker and supplier applications to use a secure socket layer (SSL) protocol so that the data is securely exchanged.

Figure 3:
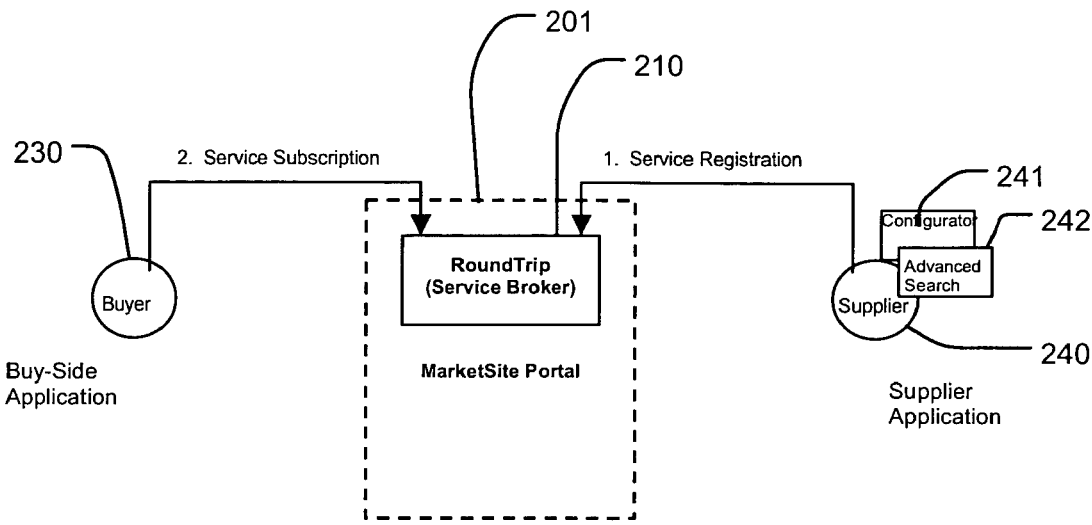
FIGS. 3-6 are schematic diagrams extracted from or resembling FIG. 3, with reduced detail to aid in understanding various processes.

FIG. 3 focuses on registration of the supplier 240, buyer 230 and their applications. In one embodiment, both the buyer and supplier receive valid market participant IDs (MPIDs) from a MarketSite administrator. In overview, the supplier registers the set of services it will provide, compatible with the RoundTrip software. For each service the supplier provides a URL that points to the service, a URN, and the type of the service. The details of the supplier's service registration are described below. The buyer subscribes to one or more services that are RoundTrip enabled. The buyer provides URLs for receiving session messages and error messages. When the buyer is using XCC, this URL may be the same as the XCC URL. The buyer provides their supplier assigned account number and their organization MPID. The MPID may identify the buyer with any level particularly, such as company, department or individual buyer. Localization information also may be provided, such as the language, country and currency for transactions. Upon registration, the buyer receives a URL to which buyer application can send a broker session start request. The details of the buyer's service subscription are described below. Note that a contractual relationship between the buyer and supplier may be the basis for receiving a supplier assigned account number and corresponding password. A trading partner may fulfill both the roles of buyer and supplier in different sessions.

The table below provides further information regarding supplier service registration, according to the RoundTrip software embodiment. The information set forth in the table enables buyer side applications to connect to and interact with a supplier's RoundTrip enabled services. The information described in the table may be provided either via a paper registration form or an online registration form verified a MarketSite operator.

| Item | Description |
| --- | --- |
| DocumentExchangeProtocolInformation | Specifies the document exchange protocol and version expected by the supplier application, e.g., "RoundTrip" version 1.0. |
| DocumentExchangeFormatInformation | Specifies data format expected by the supplier application in the "Supplier Service Session Start" and "Supplier Service Session End" data messages, e.g., CBL version 2.0. |
| DocumentExchangeTimeout | Specifies the service timeout value in minutes. |
| DocumentExchangeSecurityInformation | Will indicate the authentication scheme imposed by the trading partner's service. Options would be implicit or explicit sign-on. |
| ServiceURN | Used as a key to lookup further RoundTrip registry information. This is a supplier service specific URN, e.g., "catalog: supplier-name". Assigned by the MarketSite operator in agreement with the supplier/trading partner. |
| ServiceURL | The specific location (URL) of the service. Provided by supplier/trading partner. Examples: http://www.supplier.com/catalog.asp or http://www.supplier.com/cgi-bin/catalog.cgi/roundtrip or http://www.supplier.com/cgi-bin/catalog.cgi?FLAVOR = ROUNDTRIP. |
| ServiceSessionTimeout | Specifies service's user session timeout value in minutes. |
| TradingPartnerId | Identifies the trading partner that is registering the service. This would typically be the MPId (MarketPlace Id) of the supplier. |
| ServiceId | The service id unique to a supplier. |
| ServiceType | Specifies the type of service that is being run. |
| ServiceName | Service name. |
| AppFieldMap | Reserved for future use. |
| AppServiceData | Reserved for future use. |

The next table below provides further information regarding initial buyer registration, according to the RoundTrip software embodiment. The information described in the table may be provided either via a paper registration form or an online registration form verified a MarketSite operator. Default values, subject to overrides, can be assigned to many of these items, including localization values, the Document Exchange Protocol Information, the Accept and Cancel URLs and Labels.

| Variable | Description |
| --- | --- |
| OrgID | Buyer organization or BuySite identifier |
| BuyerAppName | Buyer application name/id. |
| BuyerAppVersion | Buyer application version. |
| BuyerAppFrameSize | Buyer application's frame size |
| DocumentExchangeProtocolInformation | Specifies the document exchange protocol and version used. For the initial release, the protocol is "RoundTrip" and the version is 1.0. |
| SessionTimeOut | Client session timeout value in minutes. |

-continued

| Variable | Description |
| --- | --- |
| Language | The user preferred two-letter ISO language code. Reference CBL element LangCode. |
| Currency | Reference CBL element CurrencyCode. |
| Country | Can be used to determine/guess the number and date formats. Reference CBL element CountryCode. |
| AcceptURL | A URL to a buyer side ASP/servlet/CGI for uploading the configured order. |
| AcceptLabel | This is the button label that the trading partner web-based services will associate with the Callback URL. Optional. |
| CancelURL | A URL to a buyer side ASP/servlet/CGI for handling the user canceling the configurator process. |
| CancelLabel | This is the button label that the suppliers will associate with the Cancel URL. |

After initial registration, the buyer will specify the supplier services that it wants to subscribe/unsubscribe to. The following information can be used to identify supplier services to which the buyer is subscribing:

| Variable | Description |
| --- | --- |
| OrgID | Buyer organization or BuySite identifier |
| SupplierID | Identifies the supplier that provides the service being registered to. This would typically be the MPId (MarketPlaceId) of the supplier. |
| SupplierServiceID | The service id unique to this supplier. |

For each service, the buyer will also register service specific data. Some examples of these data items are:

| | |
| --- | --- |
| SupplierAssignedAccountNum | For the supplier-based services, this is the customer number assigned by the supplier to the buying organization. This facilitates contract pricing. |
| DistributerAssignedAccountNum | For distributor-based services, this is the customer number assigned by the distributor to the buying organization. This also facilitates contract pricing. |

Figure 4:
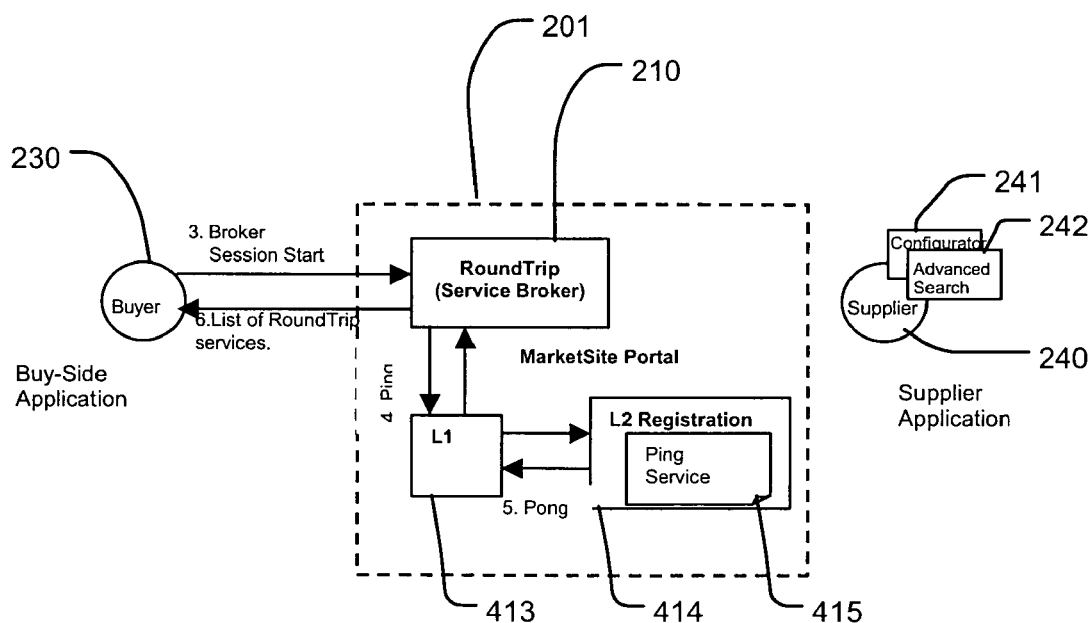
Figure 7:
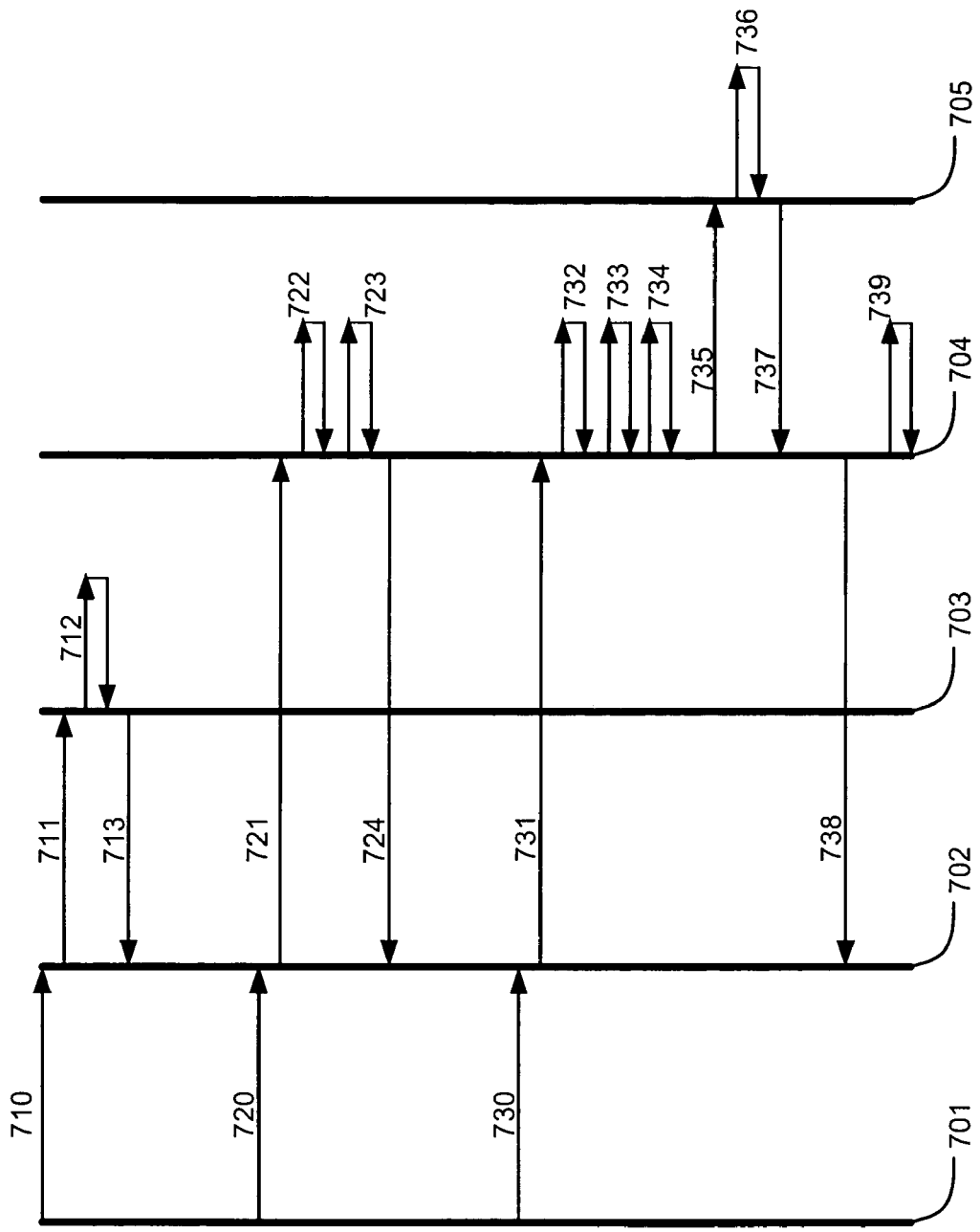
FIG. 7 is an interaction diagram from beginning with a user's initiation of a session.

FIGS. 7 and 4 generally illustrate the processes leading to issuance of the broker session start document. In FIG. 7, interactions take place among the user 701, the user's web browser 702, a buyer application or BuySite 703, a broker application 704 and the supplier application 705. The user navigates to a requisitioning screen with reference to RoundTrip software and performs some action 710. The user's action at the requisitioning screen causes an HTTP Post message 711 to be sent to the broker application for a broker session start. A schema for such a message is set forth below. The broker application verifies the user privileges 712 and takes other steps described in more detail below. The broker application issues an HTTP reply 713 to the user's web browser 702.

FIG. 4 provides additional detail regarding the broker application's processes in response to the buyer's BrokerSessionStart document. The buyer 230 sends a BrokerSessionStart document to the broker 210. An HTTP/S Get or Post connection can be used. The buyer's document contains the buyer MPID and the buying organization's user ID and password. The broker 210 validates the buyer by publishing a ping document to L1 413, using the buyer MPID and buying organization's user ID and password. The L1 component forwards the ping document to L2 414 and its ping service 415. The response is a pong message which validates the buyer. In an alternative embodiment, the SiteMinder™ product by Netegrity™ can be used to validate the buyer. Information regarding this product is available through http://www.netegrity.com/products/siteminder.html. Once the buyer is validated, the broker returns the list of services to which the buyer has subscribed. When the buyer selects one of the returned services, another HTTP/S Get or Post request from the browser, to the procurement application, through the broker is generated. In this embodiment, the buyer sends the broker a document containing the supplier-assigned userid and password, and SessionID and SessionContext for the buyer session start. The broker receives this request at the start document URL. The broker then constructs a Supplier Service Session Start XML document, and sends it on as an HTTP/S Post to the supplier.

A Sox schema for RoundTrip BrokerSessionStart message appears below. Those familiar with the art will recognize Sox as an extension to XML proposed as an open specification through W3C at HTTP://www.w3.org/TR/NOTE-SOX. The full Sox specification, version 2, has been published at http://www.commerceone.com/xml/sox/download/index.html. The schema below is self documenting. Some comments and explanations of data usage follow the schema.

```
<?xml version="1.0"?>
<!DOCTYPE schema SYSTEM
"urn:xcommerceone:document:com:commerceone:xdk:xml:
schema.dtd$1.0">
<schema uri="urn:x-commerceone:document:com:commerceone:
roundtrip:schemas:RoundTripBrokerSessionStart.sox$1.0">
<namespace prefix="cbl" namespace="urn:x-
commerceone:document:com:commerceone:CBL:CBL.sox$1.0">
<comment>
Copyright 1999 Commerce One Inc.
</comment>
    <elementtype name="BrokerSessionStart">
      <model>
        <sequence>
          <element type="LoginInfo"/>
          <element type="SessionInfo"/>
          <element type="PassThruData" occurs="?"/>
        </sequence>
      </model>
    </elementtype>
    <elementtype name="SessionInfo">
```

-continued

```
<model>
  <element type="SessionContext" occurs="?"/>
</model>
<attdef name="SessionID" datatype="string"><required/>
  <explain>
    <p>This is the user session id assigned by the buyer-side
    application.</p>
  </explain>
</attdef>
</elementtype>
<elementtype name="SessionContext">
  <model>
    <element type="string" name="OrgId" occurs="?"/> // e.g.
the BuySite internal Buying Organization id.
    <element type="string" name="ParentOrgId" occurs="?"/> <!--
e.g. the BuySite internal Enterprise (EBO) Id. -->
    <element type="string" name="OrderId" occurs="?"/> <!-- Id
of user's current requisition. -->
  </model>
</elementtype>
<elementtype name="LoginInfo">
  <explain>
    <p>The <code>LoginInfo</code> contains the
    authentication data for signing onto the RoundTrip
    services.</p>
    <p>It is intended that this element be extended to
    support other authentication schemes such as single
    sign-on.</p>
  </explain>
  <model>
    <sequence>
      <element type="Organization"/>
    </sequence>
  </model>
</elementtype>
<elementtype name="Organization">
  <attdef datatype="string" name="ID"><required/>
    <explain>
      <p>The <code>Organization</code> may be identified by a
      <code>ID</code> that is known to some
      <code>Agency</code>. The <code>Agency</code> should be
      identified with an <code>AgencyID</code> (or an
      <code>AgencyOther</code>).</p>
    </explain>
  </attdef>
  <attdef name="AgencyID" prefix="cbl"
datatype="AgencyCode"><required/>
    <!-- <explain>
      <p>An <code>Agency</code> chosen from a list of standard
      <code>Agencies</code>. This identifies the
      <code>Agency</code> that issued the <code>PartyID</code>.
      For MarketSites, use Other unless the specific MarketSite
      has an AgencyCode.</p>
    </explain> -->
  </attdef>
  <attdef datatype="string" name="AgencyOther">
    <explain>
      <p>If the <code>AgencyID</code> is <code>Other</code>
      the <code>Agency</code> identifier may be specified
      as a string. If the Agency is a MarketSite, use the
      MarketSite short name or MarketSite Participant ID.</p>
    </explain>
  </attdef>
</elementtype>
<elementtype name="PassThruData">
  <explain>
    <p>A place holder element for any other data that is
    required by the application to process the document(s) and
    other information returned in the BrokerSessionEnd.</p>
    <p><code>Content</code> - Format to be defined by the
    application. Note it cannot be in XML format (XML data can
    be URL encoded or otherwise encoded).</p>
  </explain>
  <model>
    <element name="Content" type="string" occurs="?"/>
  </model>
</elementtype>
</schema>
```

This schema works in conjunction with XML Common Business Language (xCBL) documents published as an open standard at the Commerce One download site referenced above. In other embodiments of the present invention, EBXML documents (Sun sponsored) or other schemas could be used for starting the broker session. The table below explains some data usage corresponding to the schema above.

| Variable | Description |
| --- | --- |
| SessionID | Identifies the user session. |
| SessionContext | Session context. For example, this may include the user's requisition id and buyer organization Id. |
| UserID | The user id and password field will be activated when single sign-on is enabled. |
| Password | |
| OrgID | This will be the organization's MarketSite Participant ID (MPID) when the OrgIDAgency is set to a MarketSite. Alternatively, this could an identifier assigned by another agency such as EAN. |
| OrgIDAgency | This will be the identifier for the agency that assigned the OrgID. For example, MarketSite.net or EAN. |
| PassThruData | A self-describing data structure that is passed through by the service broker. This can be used by the buyer and supplier applications to exchange service specific data without needing a protocol change. |

FIG. 7 provides an additional view of this interaction. In practice of the RoundTrip embodiment, the broker 703, at the service list selection URL receives the buyer's request for a list of available services 721. Upon receiving this request, the broker consults its database to determine the set of services to which the buyer with the given OrgID is subscribed 722. It saves the user session context for later use 723. It returns this list of services to the buyer's browser, as an HTTP/S Reply 724. The buyer selects a service from the list of services 730. This causes the browser to send an HTTP/Get or Post request 730 to the procurement application, which in turn does an HTTP/S Post 731 to the RoundTrip broker, to send to it, over an HTTP/S connection, the service selected, along with the supplier assigned userid/password. The broker looks up the URL of the selected service 732, gathers context data for use in the supplier session 733 and creates data structures to support the supplier session 734. In particular, in the RoundTrip embodiment, the broker creates the Service Session Start request document 734, and forwards it 735 over an HTTP/S connection, to the supplier 705. The supplier caches the data, performs a redirect, and then sends an HTTP/S Reply to the broker 737, who forwards the reply 738 on to the buyer 702. The broker 703 can log the session 739.

Figure 5:
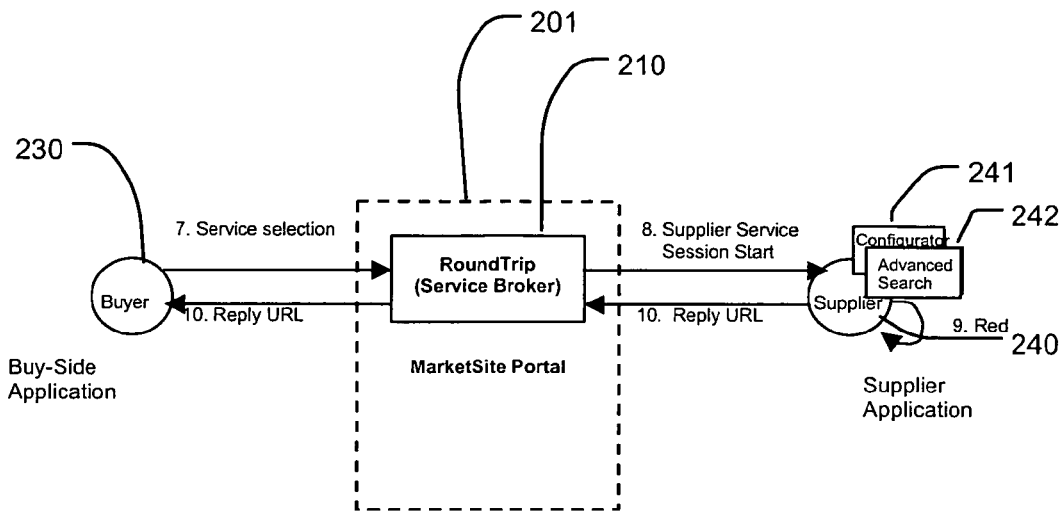

FIGS. 7 and 5 portray processes including supplier service selection and supplier service session start. The buyer 230 transmits the service selection to the broker application or e-commerce hub 210. The broker processes the selection and generates a supplier service session start document which it transmits to the supplier 240.

When the user selects a specific service URL, the Service Broker sends a "Supplier Service Session Start" request to the chosen service's supplier application. The service context data is delivered to the supplier application via an HTTP Post to the URL (ServiceURL) specified by the supplier during registration. This is the initial communication between the broker application and the service application. In the RoundTrip embodiment, data is delivered as an XML format document within a hidden form field. The name of the hidden field typically is the name of the root element tag in the document being sent—for example, RTServiceStart, RTServiceEnd, RTServiceCancel, and RTServiceError. The general form for conveying the hidden field can use the following syntax:

```
<FORM ...
< hidden name="RTServiceStart" value ="<XML document ...
>"
>
```

In greater detail, the following schema depicts one embodiment of a supplier service session start document. Both the specific schema and some common schema information used in conjunction with the specific schema are provided.

```
<?xml version="1.0"?>
<!DOCTYPE schema SYSTEM
"urn:xcommerceone:document:com:commerceone:xdk:xml:schema.
dtd$1.0">
<schema uri="urn:x-
commerceone:document:com:commerceone:roundtrip:schemas:
RoundTripServiceStart.sox$1.0">
<comment>
Copyright 1999 Commerce One Inc.
</comment>
    <namespace prefix="cbl" namespace="urn:x-commerceone:
    document:com:commerceone:CBL:CBL.sox$1.0"/>
    <namespace prefix="common" namespace="urn:x-commerceone:
    document:com:commerceone:roundtrip:RoundTripCommonTypes.
    sox$1.0"/>
 <elementtype name="RTServiceStart">
  <model>
      <sequence>
      <element prefix="common"
      type="DocumentExchangeProtocolInformation"/>
          <element prefix="common" type="SessionInfo"/>
        <element type="LoginInfo"/>
        <element name="TimeOut" type="int" occurs="?"/>
        <element prefix="cbl" name="Language" type="LangCode"
        occurs="?"/>
        <element prefix="cbl" name="Currency" type="CurrencyCode"
        occurs="?"/>
        <element prefix="cbl" name="Country" type="CountryCode"
        occurs="?"/>
        <element name="BuyerAppInfo" prefix="common"
type="ApplicationInfo"occurs="?"/>
        <element prefix="common" type="AcceptInfoType"/>
        <element prefix="common" type="CancelInfoType"/>
          <element prefix="common" type="URLDataType"
          name="ErrorURL" occurs="?"/>
        <element prefix="common" type="PassThruData" occurs="?"/>
          <element name="SupplierPartNum" type="LimitedString"
occurs="?"/>
          <element name="SupplierID" type="LimitedString"
          occurs="?"/>
          <element name="SupplierIDAgency" type="LimitedString"
occurs="?"/>
          <element name="SupplierAssignedAccountNum"
type="LimitedString" occurs="?"/>
      </sequence>
  </model>
 </elementtype>
 <elementtype name="LoginInfo">
      <explain>
        <p>The <code>LoginInfo</code> contains the
        authentication data for signing onto the RoundTrip
        services.</p>
      </explain>
  <model>
    <sequence>
        <element name="UserID" type="LimitedString" occurs="?"/>
        <element name="Password" type="LimitedString"
        occurs="?"/>
        <element name="OrgID" type="LimitedString"/>
        <element name="OrgIDAgency" type="LimitedString"
        occurs="?"/>
    </sequence>
  </model>
 </elementtype>
</schema>
Common Types
<?xml version="1.0"?>
<!DOCTYPE schema SYSTEM "urn:x-commerceone:document:com:
commerceone:xdk:xml:schema.dtd$1.0">
<schema uri="urn:x-commerceone:document:com:commerceone:
roundtrip:schemas:RoundTripCommonTypes.sox$1.0">
<comment> Copyright 1999 Commerce One Inc. </comment>
<comment> AccetpInfo and CancelInfo should use a common
datatype which could be ActionInfo
</comment>
 <elementtype name="AcceptInfoType">
    <model>
      <sequence>
        <element type="NameDataType" name="Label"/>
        <element type="URLDataType" name="URL" />
      </sequence>
    </model>
 </elementtype>
 <elementtype name="CancelInfoType">
    <model>
      <sequence>
        <element type="NameDataType" name="Label"/>
        <element type="URLDataType" name="URL" />
      </sequence>
    </model>
 </elementtype>
 <elementtype name="ScreenSize">
  <model>
      <element name="HorizontalSize" type="int"/>
      <element name="VerticalSize" type="int"/>
  </model>
 </elementtype>
 <elementtype name="SessionInfo">
  <model>
      <element type="SessionContext" type="string" occurs="?"/>
  </model>
    <attdef name="SessionID" datatype="UUID">
     <required/>
      <explain>
          <p>This is the service session id assigned by
          the broker.</p>
      </explain>
    </attdef>
 </elementtype>
<elementtype name="PassThruData">
    <explain>
        <p>A place holder element for any other data that is
        required by the application to process the document(s) and
        other information returned in the BrokerSessionEnd.</p>
        <p><code>Content</code> - Format to be defined by the
        application. Note it cannot be in XML format (XML data can
        be URL encoded or otherwise encoded).</p>
      </explain>
    <model>
      <element name="Blob" type="string"/>
    </model>
 </elementtype>
<elementtype name="DocumentExchangeProtocolInformation">
    <empty/>
    <attdef name="Protocol" datatype="LimitedString">
      <default>RoundTrip</default>
    </attdef>
    <attdef name="ProtocolVersion" datatype="LimitedString">
      <default>1.0</default>
    </attdef>
 </elementtype>
 <elementtype name="Name">
    <model>
      <element name="NameString" type="NameDataType"/>
    </model>
 </elementtype>
  <datatype name="NameDataType">
    <varchar maxlength="50" datatype="string"/>
  </datatype>
  <datatype name="LimitedString">
    <varchar maxlength="80" datatype="string"/>
```

-continued

```
  </datatype>
  <elementtype name="ApplicationInfo">
    <model>
      <element name="AppFrameSize" type="ScreenSize" occurs="?"/>
    </model>
    <attdef name="AppName" datatype="string">
      <required/>
    </attdef>
    <attdef name="AppVersion" datatype="string">
      <required/>
    </attdef>
  </elementtype>
  <datatype name="UUID">
    <varchar maxlength="64" datatype="string"/>
  </datatype>
  <datatype name="URLDataType">
    <varchar maxlength="256" datatype="string" />
  </datatype>
  <datatype name="URNDataType">
    <varchar maxlength="256" datatype="string"/>
  </datatype>
</schema>
```

The following table explains some of the data items included in the supplier service session start XML document. In this table, the Supplier Service Session Start data is categorized. Session data is MarketSite Service Broker session information. Data such as session id is used by the broker application to associate the acquired data (order details) with a supplier service session. Other data, such as language, is provided as a courtesy so that the web-based service can provide a tailored experience. Authentication data includes information such as the organization's user-id and password. Authorization data, for catalogs and configurators, for instance, includes the buyer's supplier assigned account number or customer number. Parameter data provides information required by the supplier's service application. For example, a configurator will need a supplier part number. Parameter data typically can be provided by the buyer application. Finally, action data includes button labels and URLs for accept, cancel and other actions.

| Variable | Category | Description |
| --- | --- | --- |
| DocumentExchangeProtocolInformation | Session | Specifies the document exchange protocol and version used, e.g., "RoundTrip" and the version is 1.0. |
| SessionID | Session | This client session id (UUID) allows the Roundtrip broker to associate the incoming configuration data (via Accept URL) with the supplier service and the buyer that performed the action. |
| TimeOut | Session | Client session timeout value in minutes is optional. |
| Language | Session | The user preferred two-letter ISO language code. Reference CBL element LangCode. |
| Currency | Session | Reference CBL element CurrencyCode is optional. |
| Country | Session | Can be used to determine/guess the number and date formats. Reference CBL element CountryCode. |
| BuyerAppName | Session | Buyer application name/id. |
| BuyerAppVersion | Session | Buyer application version. |
| BuyerAppFrameSize | Session | Buyer application's frame size. |
| UserID | Authentication | Used for implicit login. This means that the userid is on a per buying organization registered service basis. |
| Password | Authentication | Used for implicit login. This means that the password is on a per buying organization registered service basis. |
| OrgID | Authentication | |
| OrgIDAgency | Authentication | |
| AcceptURL | Action | A URL to a MarketSite ASP/servlet/CGI for processing the configured order. |
| AcceptLabel | Action | This is the button label that the trading partner web-based services will associate with the Accept URL. |
| CancelURL | Action | A URL to a MarketSite ASP/servlet/CGI for handling the user canceling the configurator process. |
| CancelLabel | Action | This is the button label that the suppliers will associate with the Cancel URL. |
| ErrorURL | Action | A URL to a MarketSite servlet for displaying errors. |
| PassThruData | Parameter | This parameter is passed through by the service broker. This can be used by the buyer and supplier applications to exchange service specific data that are not accounted for in the protocol. This would enable such buyers and suppliers to integrate without having to wait for a protocol change. |

The previous table shows a basic supplier service session start data layout. The following table shows a list of additional supplier specific data items that can be part of the RoundTrip Supplier Service Start document:

| Variable | Category | Description |
|---|---|---|
| SupplierPartNum | Parameter | Used by web-based configurators. |
| SupplierID | Parameter | While not required if connecting directly to a supplier, probably useful if connecting an intermediate trading partner. |
| SupplierIDAgency | Parameter | Used to identify the agency that created any identifiers (e.g. Supplier ID and Supplier Account Number) in this information set. |
| SupplierAssignedAccountNum | Parameter | For the supplier-based services, this is the customer number assigned by the supplier to the buying organization. This facilitates contract pricing. |

The following example provides a document consistent with the schema above.

```
<?xml version="1.0"?>
<?soxtype urn:x-commerceone:document:com:commerceone:roundtrip:
schemas:RoundTripServiceStart.sox$1.0?>
 <RTServiceStart
   xmlns:common="urn:x-
commerceone:document:com:commerceone:roundtrip:schemas:
RoundTripCommonTypes.sox$1.0"
   xmlns:cbl="urn:x-commerceone:document:com:commerceone:
CBL:CBL.sox$1.0">
  <common:DocumentExchangeProtocolInformation
Protocol="RoundTrip" ProtocolVersion="1.0"/>
  <common:SessionInfo SessionID="CF543873-D7B9-11D3-830B-
00609709DDA1"/>
    <LoginInfo>
    <UserID>123456</UserID>
    <Password>my password</Password>
     <OrgID>buyer organization id</OrgID>
     <OrgIDAgency>MarketSite.net</OrgIDAgency>
    </LoginInfo>
    <TimeOut>10</TimeOut>
    <Language>en</Language>
    <Currency>USD</Currency>
    <Country>US</Country>
    <BuyerAppInfo AppName="BuySite" AppVersion="6.0">
     <common:AppFrameSize>
      <common:ScreenSize>
       <common:HorizontalSize>600</common:HorizontalSize>
       <common:VerticalSize>800</common:VerticalSize>
      </common:ScreenSize>
     </common:AppFrameSize>
    </BuyerAppInfo>
    <common:AcceptInfoType>
    <common:Label>Order</common:Label>
 <common:URL>http://www.marketsite.net/servlet/end</common:URL>
    </common:AcceptInfoType>
    <common:CancelInfoType>
    <common:Label>Cancel</common:Label>
 <common:URL>http://www.marketsite.net/servlet/
cancel</common:URL>
    </common:CancelInfoType>
    <ErrorURL>http://www.marketsite.net/servlet/errhandler</ErrorURL>
    <SupplierAssignedAccountNum>4356</
SupplierAssignedAccountNum>
 </RTServiceStart>
```

FIG. 2 depicts the supplier service session and direct buyer to supplier interaction 250. The buyer and supplier communicate directly with each other, without need for broker involvement, monitoring or logging. In other embodiments, the broker can forward many or all of the messages between the buyer and supplier, thereby enabling the broker application to log all or some aspects of the interaction to facilitate error recovery.

When the buyer is done with the supplier site, he may select a Submit or Cancel button in the browser. These selections lead to generation of a Service Session End or Service Session Cancel XML document, respectively, which is to be sent to the buyer by the supplier via the broker, as a hidden form field, over HTTP/S Post. The supplier service posts to a URL (CallBackURL) specified in the Supplier Service Session Start data. The data in this posted document include Supplier Service Session End data as an XML document within a hidden form field, consistent with the following schema. The supplier's document also includes an order response (e.g., a shopping cart) as a CBL format document within a hidden form field. A schema for and example of a shopping cart response follow. The Service Session End document is sent to a buyer provided Submit URL. Alternatively, a Service Session Cancel document is sent to a buyer provided Cancel URL. The buyer receives and processes these documents.

Any errors that occur during this interaction may be posted to a specified error URL. These errors can be automatically displayed within the buyer's browser.

The supplier service session end document is an HTTP form is posted to the broker callback URL when the Supplier Service Session Ends. This form contains the "Supplier Service Session End" XML document and a List of Order Details CBL documents in hidden fields. The following syntax is used:

```
<FORM ACTION="http://roundtrip.marketsite.net/servlet/end"
METHOD="POST"
NAME="CallBackDialog">
  <INPUT TYPE="HIDDEN" NAME="RTServiceEnd"
  VALUE="<?xml version="1.0"?>
  ....
  this is an HTML encoded RTServiceEnd document
  ">
</FORM>
```

The following schema depicts a supplier service session end document.

```
<?xml version="1.0"?>
<!DOCTYPE schema SYSTEM "urn:x-
commerceone:document:com:commerceone:xdk:xml:schema.dtd$1.0">
```

-continued

```
<schema uri="urn:x-
commerceone:document:roundtrip:schemas:RoundTripServiceEnd.
sox$1.0">
<comment>
Copyright 1999 Commerce One Inc.
</comment>
    <namespace prefix="cbl" namespace="urn:x-
    commerceone:document:com:commerceone:CBL:CBL.sox$1.0"/>
    <namespace prefix="common" namespace="urn:x-
    commerceone:document:com:commerceone:roundtrip:
    RoundTripCommonTypes.sox$1.0"/>
<elementtype name="RTServiceEnd">
  <model>
    <sequence>
    <element prefix="common"
type="DocumentExchangeProtocolInformation"/>
      <element prefix="common" type="SessionInfo"/>
        <element prefix="cbl" name="Language" type="LangCode"
        occurs="?"/>
        <element prefix="cbl" name="Currency" type="CurrencyCode"
occurs="?"/>
        <element prefix="cbl" name="Country" type="CountryCode"
        occurs="?"/>
        <element type="ResponseData"/>
        <element prefix="common" type="PassThruData" occurs="?"/>
        <element name="RequestEcho" type="RTServiceStart" occurs="?"/>
      </sequence>
  </model>
</elementtype>
<elementtype name="ResponseData">
  <empty/>
  <attdef name="ResponseDataType" datatype="LimitedString">
    <required/>
  </attdef>
  <attdef name="ResponseDataFormat" datatype="LimitedString"/>
    <required/>
  </attdef>
  <attdef name="ResponseDataFormatVersion"
  datatype="LimitedString"/>
    <required/>
  </attdef>
</elementtype>
<elementtype name="ShoppingCart">
    <explain>
    <p>A <code>ShoppingCart</code> is typically returned from a
    RoundTrip session with a supplier's catalog or configurator.
    The <code>ShoppingCart</code> will contain an <code>
    OrderRequest</code>.</p>
    <p><code>OrderRequest</code> - an order request containing the
    items selected by and/or configured by the user from the supplier's
    web based catalog/configurator.</p>
    </explain>
  <extends type="ResponseData">
    <append>
      <element name="CartID" type="LimitedString"/>
      <element prefix="cbl" type="OrderRequest"/>
    </append>
  </extends>
</elementtype>
</schema>
```

In this schema, the ResponseData element enables polymorphism of the session end data document. The extension of ResponseData is self-describing. That is, the basic attributes of ResponseData, which may be extended and adapted in various embodiments, describe the extended data attributes. Data type and version attributes allow the buyer application to determine what data is associated with the message. An optional data format attribute permits further definition of the data associated with the message. This is an extension of XML. The same message, with variants, can be adapted to a variety of functions, such as conveying reference to or the values of shopping cart data, conveying product configuration data, conveying tax calculation data or conveying shipping or foreign freight forwarding data. Use of a polymorphic data schema decouples programming from the evolution of document types and applications. Use of namespaces supports coordination of document type names, development, deployment and maintenance of applications. Relative to a namespace, a schema identifier is provided with a message, which is resolvable in a context of a system identifier. In the sample schemas herein, the system identifier is explicit and part of the self-describing data. The system identifier may be universally unique, across the namespace of the Internet, or locally unique in some narrower domain. At some sacrifice of general adaptability, the system identifier may be implicit in the data tables or program code used by the buyer or supplier application or it may be implicit in the choice of a narrower domain than the Internet. Other Sox extensions of XML which are useful in practicing aspects of the present invention are support of typed data, a predefined set of intrinsic types, such as string, int, URI, and date, user defined types based on enumerated, scalar, and varchar type definitions, namespaces and versions for schemas, and an extensibility mechanism that facilitates the reuse and evolution of schemas and element types. Translation of Sox to Java data formats can leverage strong typing and data structures which are readily mapped into Java.

Polymorphism is not limited in this invention to responses from a supplier. Responses from a buyer to a supplier also can take advantage of this method and data structure. Alternatively, polymorphism can be used at the outset of a session, in a first message (not necessarily the actual first message) from the initiating party to the broker. Either the buyer or supplier can initiate a session through the broker and use polymorphism during the initiating. For example, a buyer can initiate a status inquiry or a purchase order start using data structures equivalent to ResponseData, in place of PassThroughData. A supplier can initiate a session, reversing the roles of the schemas or messages offered as examples herein, and use polymorphism during the initiating. This may be useful to a supplier for purchase order responses, invoices or advance shipment notices. At the conclusion of a session initiated by a supplier, the buyer may respond with data regarding changed conditions. Alternate schedules or other delivery information can be provided. Alternate configurations can be provided if a selected configuration has become unavailable.

The following table explains some data items that are part of the Supplier Service Session End document:

| Variable | Category | Description |
| --- | --- | --- |
| DocumentExchangeProtocolInformation | Session | Specifies the document exchange protocol and version used, e.g., "RoundTrip" and the version is 1.0. |
| SessionID | Session | Same as the Session ID provided as part of the Session Start. |

-continued

| Variable | Category | Description |
| --- | --- | --- |
| Language | Session | Useful if the result data contains a language specific text without a specified language code and the language text in the result data is different than "Language" specified in the RoundTrip context. The user preferred two-letter ISO language code. |
| Currency | Session | Useful if the result data contains a monetary amount without a specified currency code and the currency in the result data is different than "Currency" specified in the RoundTrip context. |
| Country | Session | Useful if the result data contains any country specific formatted data without a specified country code and the country specific formatted data in the result data is different than "Country" specified in the RoundTrip context. Reference CBL element CountryCode. |
| ResponseDataFormat | Response | The Session End data format |
| ResponseDataFormatVersion | Response | Version number of response data format, e.g., CBL 2.0. |
| ResponseData | Response | Polymorphic data element, supporting shopping cart and other functions. |
| ResponseDataType | Response | Specifies the type of Response Data. |
| PassThruData | | Used by the buyer and supplier applications to exchange service specific data that are not accounted for in the protocol. This would enable such buyers and suppliers to integrate without having to wait for a protocol change. |
| RequestEcho | Parameter | Echo back of original request. Provided for sanity checking - if the broker wants to process the Service End document according to data in the Service Start Request, for example. |

As an extension of ResponseData, the following schema supports a shopping cart.

```
<?xml version="1.0"?>
<!DOCTYPE schema SYSTEM "urn:x-commerceone:document:com:
commerceone:xdk:xml:schema.dtd$1.0">
<schema uri="urn:x-commerceone:document:com:
commerceone:CBL:CBL.sox$1.0">
  <intro>
    <h1>Order Request</h1>
    <p>Copyright Notice</p>
    <p>Common Business Library 2.0<br/>
    Copyright 1999 Commerce One, Inc.</p>
    <p>Permission is granted to use, copy, modify and distribute the
    DTD's, schemas and modules in the Commerce One Common Business
    Library Version 2.0 subject to the terms and conditions specified
    at <tt>http://www.marketsite.net/xml/cbl/copyright.html</tt></p>
  </intro>
  <elementtype name="OrderRequest">
    <model>
      <sequence>
        <element type="OrderRequestHeader"/>
        <element type="ListOfOrderRequestDetail"/>
        <element type="OrderRequestSummary"/>
      </sequence>
    </model>
  </elementtype>
</schema>
<?xml version="1.0"?>
```

-continued

```
<!DOCTYPE schema SYSTEM "urn:x-commerceone:document:com:
commerceone:xdk:xml:schema.dtd$1.0">
<schema uri="urn:x-commerceone:document:com:
commerceone:CBL:CBL.sox$1.0">
  <intro>
    <h1>Order Request Detail</h1>
    <p>Copyright Notice</p>
    <p>Common Business Library 2.0<br/>
    Copyright 1999 Commerce One, Inc.</p>
    <p>Permission is granted to use, copy, modify and distribute the
    DTD's, schemas and modules in the Commerce One Common Business
    Library Version 2.0 subject to the terms and conditions specified
    at <tt>http://www.marketsite.net/xml/cbl/copyright.html</tt></p>
  </intro>
  <elementtype name="OrderRequestDetail">
    <model>
      <extends type="BaseItemDetail">
        <append>
          <sequence>
            <element type="SupplierConfigNum" occurs="?"/>
            <element type="string" name="GeneralNote" occurs="?"/>
            <element type="Tax" occurs="?"/>
            <element type="ListOfAllowOrCharge" occurs="?"/>
            <element type="Price" name="BuyerExpectedUnitPrice"/>
            <element type="ListOfAttachment" name="OrderDetailAttachment" occurs="?"/>
            <element type="boolean" name="Immutable" occurs="?"/>
          </sequence>
```

```
    </append>
   </extends>
  </model>
 </elementtype>
 <elementtype name="ListOfOrderRequestDetail">
  <model>
    <element type="OrderRequestDetail" occurs="+"/>
  </model>
 </elementtype>
</schema>
<?xml version="1.0"?>
<!DOCTYPE schema SYSTEM "urn:x-commerceone:document:com:
commerceone:xdk:xml:schema.dtd$1.0">
<schema uri="urn:x-commerceone:document:com:
commerceone:CBL:CBL.sox$1.0">
 <intro>
  <h1>Order Request Header</h1>
  <p>Copyright Notice</p>
  <p>Common Business Library 2.0<br/>
  Copyright 1999 Commerce One, Inc.</p>
  <p>Permission is granted to use, copy, modify and distribute the
  DTD's, schemas and modules in the Commerce One Common Business
  Library Version 2.0 subject to the terms and conditions specified
  at <tt>http://www.marketsite.net/xml/cbl/copyright.html</tt></p>
 </intro>
 <elementtype name="OrderRequestHeader">
  <model>
   <sequence>
    <element type="datetime" name="OrderRequestDate"/>
    <element type="OrderRequestReference"/>
    <element type="OrderParty" occurs="?"/>
    <element type="Tax" occurs="?"/>
    <element type="CurrencyCode" name="OrderCurrency"/>
    <element type="LangCode" name="OrderLanguage"/>
    <element type="string" name="GeneralNote" occurs="?"/>
    <element type="boolean" name="Immutable" occurs="?"/>
<element type="ListOfAttachment"
    name="OrderRequestHeaderAttachment" occurs="?"/>
   </sequence>
  </model>
 </elementtype>
</schema>
<?xml version="1.0"?>
<!DOCTYPE schema SYSTEM "urn:x-commerceone:document:com:
commerceone:xdk:xml:schema.dtd$1.0">
<schema uri="urn:x-commerceone:document:com:
commerceone:CBL:CBL.sox$1.0">
 <intro>
  <h1>Order Request Reference</h1>
  <p>Copyright Notice</p>
  <p>Common Business Library 2.0<br/>
  Copyright 1999 Commerce One, Inc.</p>
  <p>Permission is granted to use, copy, modify and distribute the
  DTD's, schemas and modules in the Commerce One Common Business
  Library Version 2.0 subject to the terms and conditions specified
  at <tt>http://www.marketsite.net/xml/cbl/copyright.html</tt></p>
  <p>A collection of references that are used by
  <code>OrderRequest</code>.
 </intro>
 <elementtype name="OrderRequestReference">
  <explain>
   <p><code>AccountCode</code> is the agreement number between a
   buyer and a supplier. An account may contain several contracts
   in it.</p>
   <p><code>CustRefNum</code> is the Order Request identification
   number.</p>
   <p><code>BuyerRefNum</code> is Buyer's Purchase
   Order Num.</p>
   <p><code>SupplierRefNum</code> is Supplier's Order Num.</code>
   or Suppliers Sales Order Num.</p>
   <p><code>SupplierConfigNum</code> is a configuration
   number. </p>
   <p><code>ListOfReferenceCoded</code> - This is used for other
   references that a buyer want to provide to supplier, such as
   Buyer Catalog Reference Number.</p>
  </explain>
  <model>
   <sequence>
    <element type="Reference" name="AccountCode" occurs="?"/>
    <element type="Reference" name="CustRefNum" occurs="?"/>
    <element type="Reference" name="BuyerRefNum" occurs="?"/>
    <element type="Reference" name="SupplierRefNum" occurs="?"/>
    <element type="Reference" name="SupplierConfigNum"
     occurs="?"/>
    <element type="ListOfReferenceCoded" occurs="?"/>
   </sequence>
  </model>
 </elementtype>
</schema>
<?xml version="1.0"?>
<!DOCTYPE schema SYSTEM "urn:x-commerceone:document:com:
commerceone:xdk:xml:schema.dtd$1.0">
<schema uri="urn:x-commerceone:document:com:
commerceone:CBL:CBL.sox$1.0">
 <intro>
  <h1>Order Request Summary</h1>
  <p>Copyright Notice</p>
  <p>Common Business Library 2.0<br/>
  Copyright 1999 Commerce One, Inc.</p>
  <p>Permission is granted to use, copy, modify and distribute the
  DTD's, schemas and modules in the Commerce One Common Business
  Library Version 2.0 subject to the terms and conditions specified
  at <tt>http://www.marketsite.net/xml/cbl/copyright.html</tt></p>
 </intro>
 <elementtype name="OrderRequestSummary">
  <model>
   <sequence>
    <element type="Decimal18_3" name="TotalAmount"/>
    <element type="int" name="TotalLineNum" occurs="?"/>
   </sequence>
  </model>
 </elementtype>
</schema>
```

An example of an end document extended by a shopping cart morphism follows:

```
<?xml version="1.0"?>
<?soxtype urn:x-
commerceone:document:com:commerceone:roundtrip:schemas:RoundTripServiceEnd.
sox$1.0?>
<RTServiceEnd
    xmlns:common="urn:x-
commerceone:document:com:commerceone:roundtrip:schemas:RoundTripCommonTypes.
sox$1.0"
    xmlns:cbl="urn:x-
commerceone:document:com:commerceone:CBL:CBL.sox$1.0">
 <common:DocumentExchangeProtocolInformation Protocol="RoundTrip"
ProtocolVersion="1.0"/>
    <common:SessionInfo SessionID="CF543873-D7B9-11D3-830B-
00609709DDA1"/>
```

-continued

```
    <Language>en</Language>
    <Currency>USD</Currency>
    <Country>US</Country>
    <ShoppingCart ResponseDataFormat="CBL"
ResponseDataFormatVersion="2.0" ResponseDataType="OrderRequest">
        <CartID>3456</CartID>
<OrderRequest xmlns="urn:x-commerceone:document:com:commerceone:
CBL:CBL.sox$1.0">
    <OrderRequestHeader>
        <OrderRequestDate>19990531T19:55:00</OrderRequestDate>
     <OrderRequestReference>
        <AccountCode><Reference><RefNum>CTOP</RefNum></Reference>
            </AccountCode>
        <BuyerRefNum><Reference><RefNum>100</RefNum></Reference
        >
        </BuyerRefNum>
<SupplierRefNum><Reference><RefNum>2</RefNum></Reference>
        </SupplierRefNum>
            </OrderRequestReference>
            <OrderParty>
            <BuyerParty><Party>
            <NameAddress>
            <Name1>Mr. Muljadi Sulistio</Name1>
            <Name2>Attention:Business Service Division</Name2>
            <Address1>1600 Riviera Ave.</Address1>
            <Address2>Suite #200</Address2>
            <City>Walnut Creek</City>
            <State>CA</State>
            <PostalCode>94596</PostalCode>
            <Country>US</Country>
            </NameAddress>
            <OrderContact>
            <Contact>
                <ContactName>Mr. Muljadi Sulistio</ContactName>
                <Telephone>(650) 932-4555</Telephone>
                <Email>mike.holloway@commerceone.com</Email>
                <Fax>(650) 468-8900</Fax>
            </Contact>
            </OrderContact>
        <ReceivingContact>
            <Contact>
                <ContactName>Mr. Debbie Dub</ContactName>
                <Telephone>(650) 932-4555</Telephone>
                <Email>debbie.dub@commerceone.com</Email>
                <Fax>(650) 468-8900</Fax>
            </Contact>
            </ReceivingContact>
        <ShippingContact>
            <Contact>
                <ContactName>Mr.John Wayne</ContactName>
                <Telephone>(650) 932-4555</Telephone>
                <Email>john.wayne@commerceone.com</Email>
                <Fax>(650) 468-8900</Fax>
            </Contact>
            </ShippingContact>
                </Party></BuyerParty>
                <SupplierParty><Party>
         <NameAddress>
            <Name1>Millenium Supplier</Name1>
            <Name2>Attention: Office Supply Division</Name2>
            <Address1>1600 Riviera Ave.</Address1>
            <Address2>Suite #200</Address2>
            <City>Walnut Creek</City>
            <State>CA</State>
            <PostalCode>94596</PostalCode>
            <Country>US</Country>
            </NameAddress>
            </Party></SupplierParty>
        </OrderParty>
        <OrderCurrency>USD</OrderCurrency>
        <OrderLanguage>EN</OrderLanguage>
    </OrderRequestHeader>
    <ListOfOrderRequestDetail>
        <OrderRequestDetail>
            <LineItemNum>1</LineItemNum>
            <SupplierPartNum>
            <PartNum>
            <Agency>AssignedBySupplier</Agency>
            <PartID>12345</PartID>
```

-continued

```
            </PartNum>
            </SupplierPartNum>
            <ItemDescription>Sanford Highlighting
Marker<ItemDescription>
            <Quantity>
            <Qty>000000000001.000</Qty>
            <UnitOfMeasure>EA</UnitOfMeasure>
            </Quantity>
        <Transport Direction="SupplierToBuyer">
        <Mode>Air</Mode>
        <Mean>Express</Mean>
        <Carrier>Fedex</Carrier>
    <CustShippingContractNum>CTOP123</CustShippingContractNum>
    <ShippingInstruction>Please handle with care
            </ShippingInstruction>
        </Transport>
        <OffCatalogFlag>false</OffCatalogFlag>
            <BuyerExpectedUnitPrice>
        <Price><UnitPrice>00000000010.0000</UnitPrice></Price>
        </BuyerExpectedUnitPrice>
        </OrderRequestDetail>
    </ListOfOrderRequestDetail>
    <OrderRequestSummary>
        <TotalAmount>000000000001000.000</TotalAmount>
        <TotalLineNum>1</TotalLineNum>
    </OrderRequestSummary>
    </OrderRequest>
    </ShoppingCart>
</RTServiceEnd>
```

Figure 6:
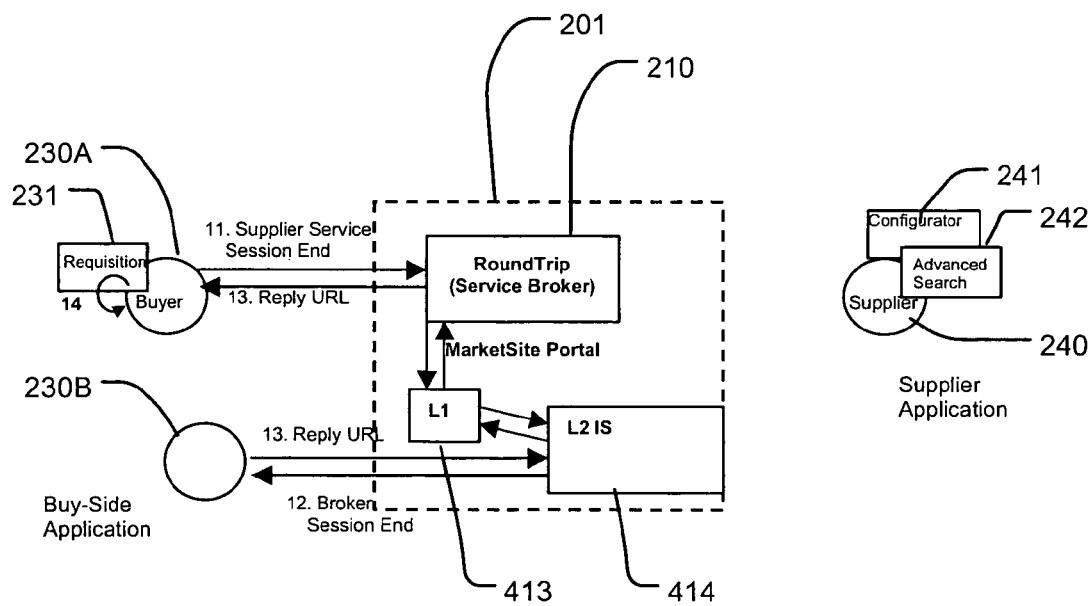

FIG. 6 depicts a sequence ending the broker session, upon completion of the supplier service session. Once the buyer 230A is done, an order or cancel button is selected at the buyer browser. This generates an HTTP/S Post of a service session end document to the broker application. The broker sends it through the L1 component 413 to a forwarding component of the L2 component 416. The forwarding component processes the data, receives a service session end document from the supplier application, forwards the document to the buyer's procurement application 230B, receives a reply, and forwards the reply to the buyer for display in the buyer's browser or other viewing software 230A. In the context of the present invention, the buyer application can refer to the buyer's browser, the procurement application or both. When the service interaction completes and the supplier sends a "Supplier Service Session End" request to the broker, the broker processes the "Supplier Service Session End" message and generates an HTTP post to the buyer callback URL that was specified by the buyer during registration. The data in this communication contains the supplier service session end data as an XML document within a hidden form field. As described above, in the instance of a shopping cart session, the order details (shopping cart) as a CBL format document within a hidden form field.

An example of one embodiment practicing aspects of the present invention begins when a user web browser is displaying ABC Motors Product Search page in which one or more motors have been selected. The user reads and selects one or more items. The user clicks on an "Order Form" link to submit the request. The ABC Motors order form page is served up by the ABC Motors server. The "Check Out" button sometimes used in e-commerce is replaced with the buyer application specified "Accept" button label. For example, the actual label may read "Add To a Requisition." The user clicks on the "Accept" button. This results in a HTTP/S Post to the ABC Motors server. The web browser is waiting for an HTTP Reply. The ABC Motors server HTTP/S Posts to the broker application the OrderRequest and context earlier provided by the broker application. The ABC Motors server is waiting for an HTTP Reply. The broker application HTTP/S Posts to the appropriate buyer application "Accept Order Request" ASP page for receiving the OrderRequest CBL and earlier provided buyer application context. The broker application is waiting for an HTTP Reply. The buyer application "Accept Order Request" ASP adds the items in the OrderRequest to the user's requisition (the buyer application context contains the user session information) and then HTTP/S Replies with HTML (to the broker application). The broker application HTTP/S Replies with the buyer application provided HTML to the ABC Motors server. The ABC Motors server HTTP/S Replies with the buyer application provided HTML to the user's web browser. The user's web browser refreshes per the HTML.

Due to the polymorphic nature of the message used to conclude the buyer-supplier session, the message is suitable for a variety of diverse applications, including product configuration, tax calculations or freight forward, in addition to this shopping cart example. A further example of a tax calculation extension to ResponseData follows:

```
<elementtype name="TaxCalculation">
    <explain>
        <p>A <code>Tax</code> is typically returned from a
        RoundTrip session with a supplier's catalog or configurator.
        The <code>ShoppingCart</code> will containan <code>
        OrderRequest</code>.</p>
        <p><code>OrderRequest</code> - an order request containing the
        items selected by and/or configured by the user from the supplier's
        web based catalog/configurator.</p>
        </explain>
    <extends type="ResponseData">
        <append>
            <element prefix="cbl" type="Tax"/>
        </append>
    </extends>
</elementtype>
</schema>
```

Additional aspects of a system practicing the present invention may include forwarding a purchase order, as depicted in FIG. 2. Cancellation and error messages, referred to above, are described by schemas following the general form of the schemas presented in the examples.

It is inherent in the present invention that methods practicing the present invention can be expressed as articles of manufacture by describing the method as embodied in a program stored on a magnetic medium. It is further inherent that those methods can be expressed as a broker server device running the broker portion of the method or as a system including buyer, broker and supplier servers running their respective portions of the method.

While the present invention is disclosed by reference to the embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims. Each method practicing the present invention may readily be recast as a device or article of manufacture.

What is claimed is:

1. A method of facilitating brokered web services at an e-commerce routing hub, including:
   receiving at an e-commerce routing hub a first request from a first computer to start a supplier service session with a service running on a second computer identified by a unique name that is not a routing address;
   looking up the unique name in a directory, matching the unique name to a routing address and to send an additional request to start the supplier service session to the second computer, whereby the first and second computers are able to engage in the supplier service session by communicating directly between themselves, without routing a message exchange through the e-commerce routing hub;
   to bring the message exchange to an end, receiving at the e-commerce routing hub first and second service session end messages from the first and second computers, matching the first and second service session end messages and recording results of the session.

2. The method of claim 1, wherein the additional request to start the service reiterates the first request to start the service.

3. The method of claim 1, further including, prior to the receiving, accepting registrations at the e-commerce hub including the address of the service that is identified by the unique name.

4. The method of claim 1, further including the second computer sending a polymorphic message including:
   a schema identifier for the additional message, resolvable in a context of a system identifier; and
   a polymorphic response including a message type and version that, in combination with the schema identifier, define one or more additional data elements of the message type and version.

5. The method of claim 1, further including the first computer sending a polymorphic message including:
   a schema identifier for the additional message, resolvable in a context of a system identifier; and
   a polymorphic response including a message type and version that, in combination with the schema identifier, define one or more additional data elements of the message type and version.

6. An e-commerce routing hub that facilitates brokered web services, including:
   a processor, memory and at least one network adapter;
   first logic running on the processor that receives a first request via the network adapter from a first computer to start a supplier service session with a service running on a second computer identified by a unique name that is not a routing address;
   second logic running on the processor that looks up the unique name in a directory and matches the unique name to a routing address;
   third logic running on the processor that sends an additional request to start the supplier service session via the network adapter to the second computer, whereby the first and second computers are able to engage in the supplier service session by communicating directly between themselves, without routing a message exchange through the e-commerce routing hub;
   fourth logic running on the processor that, responsive to first and second service session end messages from the first and second computers, matches the first and second service session end messages and records results of the session.

7. A method of initiating, conducting and ending a brokered supplier session, including:
   a buyer service sending to an e-commerce routing hub a first request to start a supplier service session with a supplier service identified by a unique name that requires resolution of the name into a routing address, in order for the e-commerce routing hub to broker the supplier service session;
   the buyer service conducting a brokered supplier session including a direct message exchange with the supplier service that bypasses the e-commerce the buyer service sending the e-commerce routing hub a first service session end message and at least some report of results of the brokered supplier session, whereby the buyer service relies on the e-commerce routing hub to verify conclusion of the brokered supplier session.

8. The method of claim 7, wherein the sending is accomplished from a web browser by selecting a link on a web page.

9. The method of claim 7, further including, prior to the sending, the buyer service registering with the e-commerce hub and subscribing to the supplier service identified by the unique name.

10. The method of claim 7, further including receiving from the supplier service a polymorphic message including:
    a schema identifier for the additional message, resolvable in a context of a system identifier; and
    a polymorphic response including a message type and version that, in combination with the schema identifier, define one or more additional data elements of the message type and version.

11. The method of claim 7, further including sending to the supplier service a polymorphic message including:
    a schema identifier for the additional message, resolvable in a context of a system identifier; and
    a polymorphic response including a message type and version that, in combination with the schema identifier, define one or more additional data elements of the message type and version.

* * * * *

UNITED STATES PATENT AND TRADEMARK OFFICE
CERTIFICATE OF CORRECTION

| | | |
|---|---|---|
| PATENT NO. | : 7,895,079 B2 | Page 1 of 1 |
| APPLICATION NO. | : 11/343039 | |
| DATED | : February 22, 2011 | |
| INVENTOR(S) | : Jain et al. | |

It is certified that error appears in the above-identified patent and that said Letters Patent is hereby corrected as shown below:

In Claim 7, column 28, line 34, insert --routing hub;-- after the phrase "that bypasses the e-commerce".

Signed and Sealed this
Nineteenth Day of April, 2011

David J. Kappos
*Director of the United States Patent and Trademark Office*